United States Patent Office 3,547,783
Patented Dec. 15, 1970

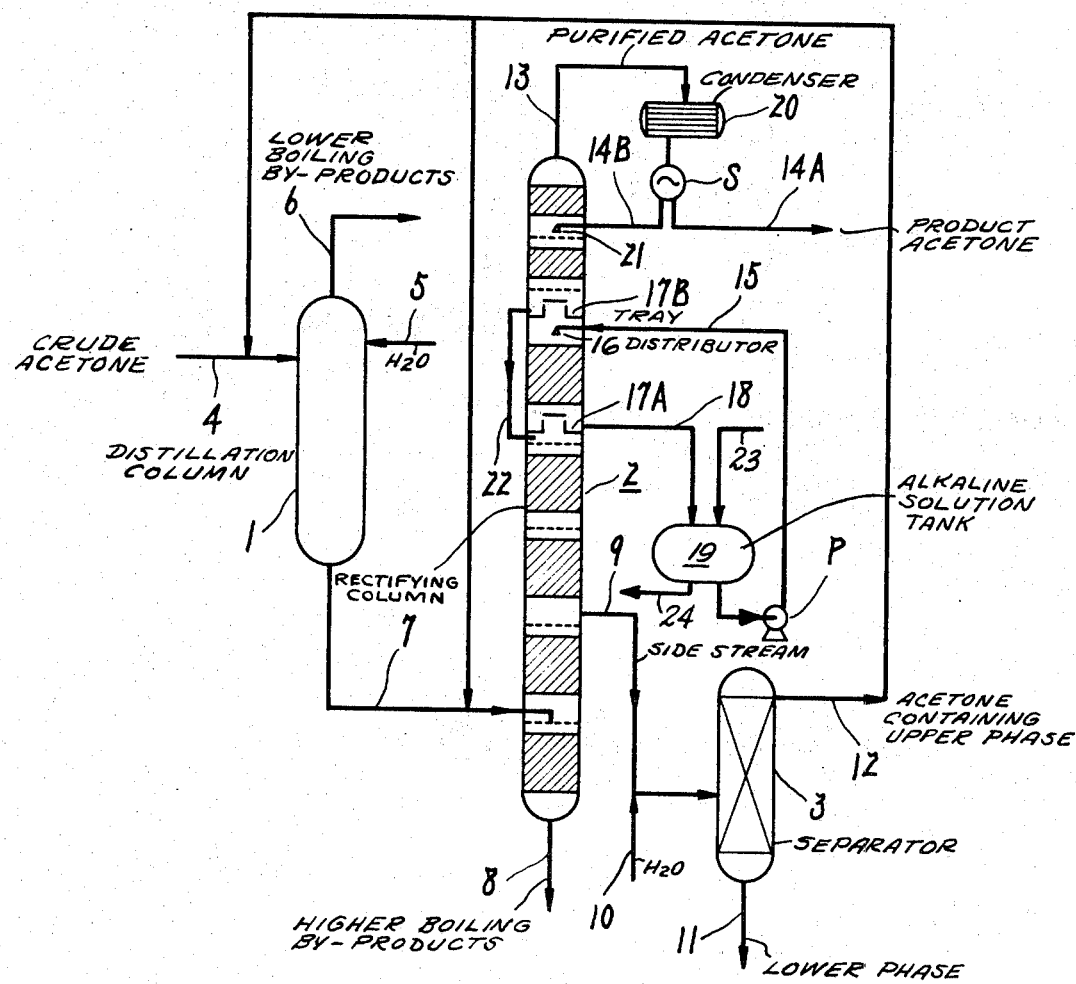

3,547,783
METHOD FOR REFINING ACETONE BY RECTIFICATION WITH ALKALI-CONTACT OF VAPORS AND WATER ADDITION AND PHASE SEPARATION OF A CHLORINATED-BY-PRODUCT-CONTAINING SIDE STREAM
Shinichi Yamaguchi, Toshio Teranishi, Satoshi Ogura, and Shiro Sano, Kurashiki-shi, Japan, assignors to Mitsubishi Chemical Industries Limited, Tokyo, Japan, a corporation of Japan
Continuation of application Ser. No. 623,577, Mar. 16, 1967. This application July 3, 1969, Ser. No. 845,626
Claims priority, application Japan, Mar. 30, 1966, 41/19,195, 41/19,196
Int. Cl. B01d 3/40; C07c 49/04
U.S. Cl. 203—37       15 Claims

ABSTRACT OF THE DISCLOSURE

A method for refining acetone manufactured by the Wacker Process which comprises withdrawing a side stream from the mid-part of a column for rectifying the acetone, wherein chlorine-containing by-products accumulate; mixing water with the withdrawn side stream; separating the mixture into an aqueous phase containing the major portion of acetone included in said side stream, and an oily phase; and returning said aqueous phase to the acetone refining system.

---

This application is a streamlined continuation of copending application Ser. No. 623,577, filed Mar. 16, 1967, and now abandoned.

The invention relates to a method for refining acetone. More particularly, the invention relates to a method for refining such acetone that has been manufactured by the so-called "Wacker Process" in which propylene is oxidized by means of contact with a solution containing a salt of metals of the platinum group such as palladium chloride, and chlorides of heavy metals such as copper which have at least two valence stages.

For the manufacture of refined acetone on an industrial scale, it is conventional to distill an aqueous crude acetone solution. For example, in order to refine crude acetone resulting from the oxidation of propylene by means of contact with a solution containing palladium chloride and cupric chloride, it is usual to subject the crude acetone to water extractive distillation for the removal of by-products having a lower boiling point and then to rectification to remove by-products having a higher boiling point such as acetic acid, propionic acid and chlorinated acetones.

Although some of the by-products contained in crude acetone may be removed by means of a rectifying column from the bottom thereof, chlorine-containing by-products tend to accumulate in the mid part of the rectifying column which in turn adversely affects the purity of the acetone produced, as well as shortening the life of the column by corrosion.

In the past, various methods have been proposed for obtaining refined acetone from a crude acetone solution in which there are chlorine-containing by-products. For example, the method disclosed in German Pat. No. 1,191,-798 comprises oxidizing propylene in the presence of a catalytic solution containing a salt of metals of platinum group and chlorides of heavy metals capable of at least two valence stages to obtain a crude acetone, introducing the resulting crude acetone into a rectifying column, withdrawing a portion of the acetone accompanied by accumulated chlorinated acetones through an appropriate part of the column, and introducing them into a separate distilling column to recover the acetone, returning the distilled acetone in the form of vapor to the rectifying column via the top of the distilling column, while treating the acetone vapor at the upper part of the rectifying column with an aqueous alkaline solution for the removal of a small amount of impurities contained in the acetone. Refined acetone is withdrawn from the top of the column, and the impurities with higher boiling points from the bottom of the column.

According to the method of the German patent, it is feasible to obtain acetone of high purity. Nevertheless there are disadvantages, in that chlorine-containing by-products tend to accumulate in the rectifying column, leading to corrosion of the column. Also tarry matter is produced by the reaction of said by-products with an aqueous alkaline solution which takes place at the upper part of the rectifying column. The production of the tarry matter adds to the pressure drop in the column by clogging various passages inside the column, whereby the apparatus has to be shut down frequently. Otherwise, it could continue to operate for a much longer period of time.

The inventors have discovered that the disadvantages of the process of the German patent are due to the existence of chlorinated propionaldehydes in the crude acetone, as well as the chlorinated acetones mentioned in the German patent.

Because the boiling point of chlorinated propionaldehyde is close to that of acetone, the major portion of chlorinated propionaldehydes is likely to be returned to the rectifying column and accumulate together with the acetone when the acetone is recovered by distillation from the side stream. This stream is rich in the chlorine-containing by-products withdrawn from the mid part of the rectifying column. As a result, a substantial portion of chlorinated propionaldehydes present in the mid part of the rectifying column moves toward the top of the column together with acetone to react with the aqueous alkaline solution. This produces a tarry mass, which causes the above-mentioned trouble.

Table 1 shows an example of the composition of a typical side stream rich in chlorine-containing by-products as withdrawn from the mid part of the rectifying column and the compositions of vapor and liquid removed from the top and bottom of the distilling column according to the German patent.

TABLE 1

|  | Liquid from the mid part of rectification column in 0.7t/hr. (wt. percent) | Vapor from the top of restorative distilling column in 0.4t/hr. (wt. percent) | Liquid from the bottom of restorative distilling column in 0.52t/hr. (wt. percent) |
|---|---|---|---|
| Acetone | 13.8 | 20.0 | 3.2 |
| Water | 40.9 | 16.7 | 84.9 |
| Chlorinated propionaldehydes | 21.5 | 35.8 | 1.5 |
| Chlorinated acetones | 20.5 | 24.4 | 8.8 |
| The rest | 3.0 | 3.1 | 1.6 |

From the above results, the yields of respective ingredients of the side stream are computed as shown in the following Table 2:

TABLE 2

| | Percent |
|---|---|
| Acetone | 83 |
| Chlorinated propionaldehydes | 95 |
| Chlorinated acetones | 69 |
| The rest | 60 |

As is apparent from Table 2, it is practically impossible to remove chlorinated propionaldehydes from the rectifying column by the use of the method of the German patent.

It is, therefore, a general object of the present invention to provide a method of refining crude acetone which contains chlorine-containing by-products.

An object of the invention is to provide a method of obtaining refined acetone at a higher yield from this type of crude acetone.

Another object of the invention is to provide a method for refining crude acetone which may be carried out continuously with a minimum of down time of the apparatus.

These and other objects and advantages of the invention will become apparent from the disclosure.

The above-mentioned objects of the invention are achieved by a method which starts with crude acetone resulting from oxidizing propylene in the presence of a catalyst. The catalyst contains the salt of at least one metal of the platinum group (such as palladium chloride) and a chloride of a heavy metal (such as copper) which has at least two valence stages. The reaction products enter a rectifying column, and the acetone is distilled off from the top thereof while the higher boiling impurities are drawn off from the bottom of the column. A side stream is withdrawn from the mid part of the column, and water added thereto and mixed therewith. The resultant mixture separates on standing into an aqueous acetone-containing phase and an oily phase, the latter composed chiefly of impurities. The aqueous phase is returned either to the rectification process or to the previous crude acetone refining process.

Preferably, the side stream is withdrawn from that zone of the mid part of a rectifying column in which the chlorine-containing impurities concentrate. When allowed to stand, the mixture of water and the side stream separates into an upper layer composed of an aqueous solution and a lower layer composed of an oily liquid. The mixture is prepared by adding water in a ratio of 0.25 to 3.0 times the stream volume; preferably 1 to 2 times the stream volume. The temperature is from 5° to 60° C., preferably 20° C. to 40° C. As a result of this "water treatment," the major portion of acetone contained in the side stream migrates into the aqueous upper layer, while the impurities go into the lower layer and are removed from the system. The upper liquid layer containing acetone is either fed into the refining process, which precedes the rectifying steps, or into an appropriate part of the rectifying column.

Table 3 shows the results of the analyses determined by a gas chromatography of the composition of each of the upper and lower layers as separated by settling from a mixture prepared at about 25° C. and comprising 100 parts by weight of the side stream of the same composition as in Table 1, and 108.6 parts by weight of water, the proportion of the side stream to the water being 1 to 1 by volume.

TABLE 3

| | Upper layer, wt. percent (185.7 wt. part) | Lower layer, wt. percent (22.9 wt. part) |
| --- | --- | --- |
| Acetone | 6.2 | 10.5 |
| Water | 79.7 | 7.7 |
| Chlorinated propionaldehydes | 7.5 | 32.9 |
| Chlorinated acetones | 5.6 | 43.9 |
| The rest | 1.0 | 5.0 |

Table 4 shows the amount of migration to the upper layer as computed in percent on the basis of the above results:

TABLE 4

| | Percent |
| --- | --- |
| Acetone | 83 |
| Chlorinated propionaldehydes | 65 |
| Chlorinated acetones | 51 |
| The rest | 62 |

As distinct from the restorative distillation method of the German patent, the present water treatment process makes it possible to considerably improve the efficiency of the removal of impurities, particularly such as chlorinated propionaldehydes and chlorinated acetones. As a result, there is a decrease in the amount of chlorine-containing impurities which accumulate in the rectifying column which results in a substantial decrease in chlorine-containing impurities reaching the upper part of the collum along with acetone. Therefore, the alkaline treatment carried out at the upper part of the rectifying column may either be simplified, minimized or eliminated entirely.

An example of the refining of acetone in accordance with the method of the invention will now be described in detail, reference being had to the annexed drawing:

Crude acetone separated from the catalytic solution is introduced into distilling column 1 through conduit 4. A quantity of water is introduced into said distilling column via conduit 5 for the water extractive distillation, and impurities having a lower boiling point are discharged via pipe 6 out of the system. The crude acetone free from lower boiling impurities is introduced into the rectifying column 2 through conduit 7, and the impurities having a higher boiling point are removed from the system through the bottom of the column via conduit 8. Refined acetone in the form of vapor coming out of the top of the column is introduced into condenser 20 via conduit 13 to condense in the form of liquid. A portion of the liquid acetone is withdrawn out of the system by means of shunt S via conduit 14A as the final product and the rest of the liquid acetone is refluxed back into the rectifying column through conduit 14B and distributor 21. It is then collected on tray 17B and subsequently transferred below 17A through conduit 22. The sidestream is withdrawn from the mid part of the rectifying column via conduit 9 while water is introduced via conduit 10 for mixing in conduit 9. The resulting mixture is then introduced into separator 3 where upper and lower layers form on standing: the oily lower layer is discharged out of the system via conduit 11, while the upper layer is returned to an appropriate step of the acetone refining process through conduit 12. An alkaline solution is pumped to the upper part of rectifying column 2 by means of pump P via conduit 15 for spraying inside the column through distributor 16 to contact a countercurrent stream of ascending acetone vapor. The alkaline solution is collected on tray 17A and returned to alkaline solution tank 19 via conduit 18. In some instances, this alkaline treatment may be eliminated, if so desired.

In accordance with the invention, chlorine-containing impurities are prevented from accumulating in the rectifying column. When the above-mentioned continuous process of the refining has reached a steady state, it is easy to keep the concentration of the impurities in the liquid less than 4 mols per litre in the mid part of the column where they are most concentrated. The concentration may be reduced lower even than 3 mols per litre if desired. It is understood that according to the method of the German patent, the concentration usually exceeds approximately 6.5 mols per litre.

Consequently, the apparatus is remarkably corrosion free, owing to the reduced concentration of the chlorine-containing impurities in the column. Further, the very small amount of chlorine-containing impurities which reaches the upper part of the column results in a higher purity of acetone distilled off the top. Still further, the alkaline treatment at the upper part of the column therefore produces only a minimal amount of tarry matter, permitting the apparatus to operate continuously for long periods of time. In addition, while in the method of the German patent the waste discharged from the bottom of a restorative distilling column consists of a dilute aqueous chlorinated acetone-containing solution having, for example, 85% water; the oily liquid waste discharged from the bottom of the separator in the method of the present invention contains only about 10% of water, which facilitates the subsequent treatment thereof.

Some examples of the invention will now be described for the purpose of illustrating the invention, and are not intended to limit its scope.

EXAMPLE 1

Gaseous propylene was brought into contact with a catalytic solution containing palladium chloride, cupric chloride and hydrochloric acid to produce crude acetone from which the catalytic solution was then removed. Refining was carried out in the apparatus which is diagrammatically depicted in the annexed drawing. The crude acetone was introduced into distilling column 1, to which a quantity of water was added for the water extractive distillation. The resulting aqueous crude acetone solution which contained 10.1% of acetone was introduced into rectifying column 2 via conduit 7 at the rate of 20 kg./hr. An aqueous 30% caustic soda solution was fed to the upper part of the rectifying column through conduit 15 at the rate of 4 kg./hr. to contact the ascending acetone vapor. The side stream was withdrawn from the mid part of the column through conduit 9 at the rate of 0.7 kg./hr. The composition of the side stream is shown in Table 5:

TABLE 5

| | Wt. percent |
| --- | --- |
| Water | 30.9 |
| Acetone | 17.2 |
| Chlorinated propionaldehydes | 20.7 |
| Chlorinated acetones | 26.0 |
| The rest | 5.2 |

A mixture of 200 parts by volume of the side stream and 200 parts by volume of water was stirred for about 5 minutes at about 25° C. and left to stand for separation into an upper layer and a lower layer. The upper layer consisted of 346.2 parts by weight of aqueous solution having a specific gravity (at 25° C.) of 1.043. The lower layer consisted of 45.6 parts by weight of oily liquid having a specific gravity (at 25° C.) of 1.106. The aqueous solution, containing about 79% of the acetone previously contained in the side stream, was returned to distilling column 1.

In the cases where 100 and 300 parts by volume of water were added to the side stream, the percent of acetone which migrated to the upper layer was found to be 76% and 85%, respectively.

EXAMPLE 2

The same method as in Example 1 was followed to refine crude acetone. The composition of the side stream withdrawn from the mid-part of the rectifying column is shown in Table 6:

TABLE 6

| | Wt. percent |
| --- | --- |
| Water | 27.8 |
| Acetone | 23.2 |
| Chlorinated propionaldehydes | 21.2 |
| Chlorinated acetones | 24.8 |
| The rest | 3.0 |

A mixture of 200 parts by volume of the side stream and 200 parts by volume of water was stirred at about 25° C. and left to stand, and separated into an upper layer and a lower layer. The aqueous layer had a specific gravity (at 24° C.) of 1.041 and weighed 366.9 parts, and the oily liquid had a specific gravity (at 24° C.) of 1.099 and weighed 38.1 parts. The aqueous solution, which contained about 84% of the acetone from that of the side stream, was returned to the distilling column.

When 300 parts by volume of water were added to the side stream 88% of the acetone migrated to the upper layer.

EXAMPLE 3

The same method of Example 1 was followed to refine crude acetone.

The composition of the side stream withdrawn from the mid part of the rectifying column is shown in Table 7.

TABLE 7

| | Wt. percent |
| --- | --- |
| Water | 40.2 |
| Acetone | 13.9 |
| Chlorinated propionaldehydes | 20.8 |
| Chlorinated acetones | 20.3 |
| The rest | 4.8 |

A mixture of 200 parts by volume of the side stream and 200 parts by volume of water was stirred at about 40° C. and left to stand for separation into an upper layer and a lower layer. The aqueous solution had a specific gravity (at 40° C.) of 1.035 and weighed 381.0 parts, and the oily liquid had a specific gravity (at 40° C.) of 1.108 and weighed 35.1 parts. The aqueous solution, which contained about 84% of the acetone from the side stream, was returned to the rectifying column.

The water treatment which was carried out at 25° C. with the same method resulted in a 78% recovery of the acetone.

EXAMPLE 4

The same method as in Example 1 was followed for refining a crude acetone. A side stream was withdrawn from the mid-part of the rectifying column at the rate of 0.7 kg./hr. to which was added water via conduit 10 at the rate of 0.7 kg./hr. for mixing at about 40° C. The resulting mixture was introduced into separator 3, and separated into upper and lower layers on standing. The upper layer comprised an aqueous solution, and was returned to rectifying column 2 via conduits 12 and 7. The lower layer, composed of an oily liquid, was discharged out of the system through conduit 11.

Under these conditions, the rectifying column operated continuously for a period of a week and yielded refined acetone at the rate of 1.91 kg./hr. from the top of the column, indicating 94.4% yield of refined acetone in proportion to the crude acetone introduced into the rectifying column through the distilling column.

Table 8 shows the quality of the refined acetone.

TABLE 8

| | |
| --- | --- |
| Potassium permanganate test [1] | More than 5 hrs. |
| Moisture | 0.25%. |
| Specific gravity | $d^{20}_{20}=0.791$ |
| Litmus test | Neutral. |
| Acidity [2] | 0.0008%. |
| Vaporization residue | 0.0002%. |

[1] On the basis of ASTM D–1363.
[2] Conversion value of acetic acid from acidic components contained in acetone.

What is claimed is:

1. In a process for refining crude acetone containing chlorinated by-products, the crude acetone being produced by the oxidation of propylene in the presence of an aqueous catalyst, the catalyst containing a platinum group metal salt and at least one chloride of a heavy metal having at least two valence stages, the process comprising the steps of subjecting the crude acetone to a water extractive distillation to remove lower boiling impurities present therein; rectifying the crude acetone from which the lower boiling impurities have been removed in a rectifying column; withdrawing refined acetone from the top of the column while discarding higher boiling impurities from the bottom of the column; wherein the improvement comprises the additional steps of withdrawing a side stream which contains acetone and chlorinated by-products from the mid-part of the column where said chlorinated by-products accumulate; adding water to said side stream to form an aqueous liquid phase and an oily liquid phase, the aqueous phase containing the major portion of the acetone included in the side stream, and the oily phase mainly containing the chlorinated by-products; separating the aqueous phase from the oily phase; and recycling the separated aqueous phase to the rectification step or the water extractive distillation step.

2. A method according to claim 1, characterized in that said catalyst contains palladium chloride and copper chlorides.

3. A method according to claim 1, characterized in that said aqueous phase is recycled to the water extractive distillation step.

4. A method according to claim 1, characterized in that said aqueous phase is recycled to the rectification step.

5. A method according to claim 1, characterized in that the quantity of water added to said side stream is 0.25–3.0 times the volume of said side stream.

6. A method according to claim 1, characterized in that the quantity of water added to said side stream is 1 to 2 times the volume of said side stream.

7. A method according to claim 1, characterized in that said water is added to said side stream at a temperature of from 5° C. to 60° C.

8. A method according to claim 1, characterized in that said water is added to said side stream at a temperature of from 20° C. to 40° C.

9. A method according to claim 1, characterized in that an alkaline solution is added to the upper part of the rectifying column, whereby it countercurrently contacts ascending acetone vapor in the column.

10. In a method for refining crude acetone containing chlorinated by-products, the crude acetone being produced by contacting propylene with an aqueous catalyst containing palladium chloride and cupric chloride, said process comprising the steps of subjecting the crude acetone to a water extractive distillation to remove lower boiling impurities present therein; rectifying the crude acetone, from which the lower boiling impurities have been removed, in a rectifying column; contacting acetone vapor counter-currently with an alkaline solution introduced at the upper part of the rectifying column; and withdrawing refined acetone from the top of the column while discharging higher boiling impurities from the bottom of the column, wherein the improvement comprises the additional steps of withdrawing a side stream containing acetone and chlorinated by-products from the mid-part of the column where chlorinated by-products accumulate; adding water to said side stream in an amount of 0.25 to 3.0 times the volume of said side stream at a temperature of from 5° C. to 60° C. to form an aqueous liquid phase and an oily liquid phase, the aqueous phase containing the major portion of the acetone included in said side stream, and the oily phase containing the chlorinated by-products; separating the aqueous phase from the oily phase; and recycling the separated aqueous phase to the water extractive distillation step or to the rectification step.

11. A method according to claim 10, characterized in that the quantity of water added to said side stream is 1 to 2 times the volume of said side stream and said water is added thereto at a temperature of from 20° C. to 40° C.

12. A method according to claim 10 wherein the separated aqueous phase is recycled to the water-extractive distillation step.

13. A method according to claim 10 wherein the separated aqueous phase is recycled to the rectification step.

14. A method according to claim 10, further including the step of withdrawing the alkaline solution from the column after its contact with the acetone vapor, said withdrawal being at a first column point above said mid-part.

15. A method according to claim 14, further including the steps of withdrawing refluxed acetone descending from the head of the column and reintroducing the withdrawn refluxed acetone into the column at a second column point, said second point being between said first point and said mid-part.

References Cited
UNITED STATES PATENTS

| | | | |
|---|---|---|---|
| 2,238,016 | 4/1941 | Downey | 203—44 |
| 2,669,541 | 2/1954 | Catterall | 203—96 |
| 2,797,191 | 6/1957 | Jarboe et al. | 203—98 |
| 3,031,384 | 4/1962 | Sirois et al. | 260—593 |
| 3,265,592 | 8/1966 | Van der Weel | 203—37 |
| 3,330,741 | 7/1967 | Theilig et al. | 203—36 |
| 3,365,375 | 1/1968 | Nixon | 203—98 |

WILBUR L. BASCOMB, Jr., Primary Examiner

U.S. Cl. X.R.

203—46, 85, 96, 98, 99; 260—593